(12) United States Patent
Reading et al.

(10) Patent No.: US 6,571,835 B2
(45) Date of Patent: Jun. 3, 2003

(54) VALVE ASSEMBLY, APPARATUS AND METHOD OF FILING A PRESSURIZED GAS CONTAINER

(75) Inventors: Peter Trevor Reading, Godalming (GB); Andrew Peter Webb, Overijse (BE); John Irven, High Wycombe (GB); Lieve Anna De Paepe, Muizen (BE)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/909,004

(22) Filed: Jul. 19, 2001

(65) Prior Publication Data

US 2002/0007865 A1 Jan. 24, 2002

(30) Foreign Application Priority Data

Jul. 21, 2000 (GB) .............................................. 0018011

(51) Int. Cl.[7] ................................................ B65B 1/04
(52) U.S. Cl. ........................ 141/67; 141/302; 141/351; 137/614.04
(58) Field of Search ................................. 141/2, 18, 301, 141/302, 346–351, 67, 364–369; 137/614.04, 614.05

(56) References Cited

U.S. PATENT DOCUMENTS

| 3,318,346 | A | * | 5/1967 | Maltner ....................... 137/588 |
| 4,406,314 | A | | 9/1983 | Gomersall ..................... 141/4 |
| 4,637,441 | A | | 1/1987 | Gomersall ................... 141/349 |
| 4,917,156 | A | | 4/1990 | Varlet ........................... 141/20 |
| 5,560,405 | A | * | 10/1996 | Harris et al. ........... 137/614.04 |
| 5,634,505 | A | * | 6/1997 | Wong ..................... 137/614.05 |
| 5,669,426 | A | * | 9/1997 | Fontaine, Jr. .......... 137/614.17 |

* cited by examiner

*Primary Examiner*—Steven O. Douglas
(74) *Attorney, Agent, or Firm*—Willard Jones, II

(57) ABSTRACT

Pressurized gas containers 36 are refilled from a source of high pressure gas using a valve assembly 1,3 that comprise a first 1 and second 3 gas flow control unit, the control units having a first valve 6 and a second valve 42 respectively, in which assembly further comprises actuators 22, 56 for cooperatively opening the valves when the control units are provided in compressed engagement, preferably using a lever action.

12 Claims, 4 Drawing Sheets

VALVE ASSEMBLY, APPARATUS AND METHOD OF FILING A PRESSURIZED GAS CONTAINER

TECHNICAL FIELD OF THE INVENTION

The present invention relates generally to the field of storing and dispensing pressurized gas. In particular, the present invention relates to a valve assembly for use with a pressurized gas container filling system and a method of filling a pressurized gas container such as a low-pressure gas cylinder.

The term "gas" is used herein to describe not only the gaseous state of a substance but also an aerosol and a vapour associated with a liquefied gas.

BACKGROUND OF THE INVENTION

Gases are conveniently stored and transported in a pressurized state, often in a pressurized gas cylinder. For many domestic (i.e. non-industrial) applications, it is convenient that the pressurized gas cylinder be portable. For example, a scuba diver needs to have a portable supply of breathable gas in order to remain underwater for any length of time and a paramedic needs a portable supply of oxygen for administration to an injured person at the scene of an accident. In addition, DIY welding gases are also stored in portable cylinders as too is carbon dioxide in fire extinguishers.

A further example of a domestic application of pressurized gas is the use of pressurized "lighter-than-air" gas to fill balloons. Suitable "lighter-than-air" gases include helium or "balloon gas" (predominately helium). Usually, the balloons are referred to as helium-filled balloons.

In recent years, there has been a marked increase in the demand for helium-filled balloons. Such balloons are used for example as party decorations, children's' toys or promotional and advertising materials. As a result of this demand, helium-filled balloons are widely available from many different retail outlets. These outlets may specialize in other goods but sell helium-filled balloons as a side-line or may specialize in selling helium-filled balloons, e.g. stand-alone stalls located in shopping malls or high streets.

In addition, some outlets rent cylinders of pressurized balloon gas to the public. A rented cylinder would then be taken to the place where large numbers of helium-filled balloons are required so that the balloons may be filled in situ. In such cases, the cylinders would be transported using a vehicle such as the family car.

Industry also uses cylinders of pressurized gases. For example, where an inert atmosphere is required, the atmosphere could be provided by an unreactive (or "inert") gas, stored in and dispensed from a pressurized gas cylinder. Whilst industrial cylinders tend to hold more gas than domestic cylinders, portable cylinders in general tend to have a small storage capacity and, thus, quickly become empty and need replacing frequently.

One solution to this problem is to provide disposable containers. Gas Container Services Limited of Roadway No. 7, Colwick Industrial Estate, Nottingham, NG4 2JW, United Kingdom provides a helium-filled balloon kit comprising a disposable helium tank under the trade mark BALLOON TIME.

More commonly, portable pressurized gas cylinders are designed to be refillable from a high-pressure gas source. Two options exist in this regard. First, the empty cylinders may be collected and taken to a central filling depot for refilling. The second option is to refill the cylinders at their place of use or sale. In this connection, the process of transferring gas from a high-pressure cylinder to a low-pressure cylinder is known as "transfilling".

The first option is currently the preferred option for the re-filling of cylinders for industrial use in which the cylinders are transported to the filling depot using a purpose built lorry. Unfortunately, for domestic applications (where the quantity of gas in a single cylinder is less that that for industrial applications resulting in shorter periods between cylinder refills), this approach is less attractive as it requires the transportation of large quantities of cylinders on a frequent basis, which can be expensive and time-consuming.

When a pressurized cylinder is re-filled at the filling depot, the outlet of the cylinder is connected to a filling manifold that is, in turn, connected via a flexible hose to a source of high-pressure gas. In this case, the source of high-pressure gas is a compressor or pump and vaporizer in gas flow communication with a gas source. A valve on the cylinder outlet is opened and the cylinder is charged with gas from the high-pressure gas source to a pre-set pressure by opening a feed valve. On completion, the feed valve is closed first and then the cylinder valve is closed. The filling manifold is then vented using a vent valve and the flexible hose is disconnected. This specific sequence of steps is repeated each time a cylinder is refilled. This is not only time-consuming but also requires specialist training.

A gas flow control device must then be fitted to the outlet of the cylinder before the cylinder is able to dispense gas for its intended application. For example, with cylinders of balloon gas, a regulator and balloon filling attachment must be fastened to the cylinder outlet before the cylinder may be used to fill balloons.

West Winds of 33672 Pin Oak Parkway, Avon Lake, Ohio 44012, USA provides a transfill system that allows high pressure helium gas cylinders to be refilled at retail premises using a flexible hose connected to a supply of higher pressure helium gas. The higher-pressure helium gas supply can take the form of more than one cylinder linked in series. The system uses the same sequence of connections, valve operations and disconnections as used in connection with the depot transfill system described above. Further, a gas flow control unit needs to be connected to a re-filled cylinder before gas can be safely dispensed from the cylinder to fill balloons.

Both of these systems require a specific sequence of steps in order to safely transfill a pressurized gas cylinder from a higher-pressure gas source and specialist training is required. If the valves are not operated in the correct sequence, the receiving cylinder could be under or over-filled or high-pressure gas could be released. Further, the West Winds system is designed to transfill high-pressure cylinders from a source of higher-pressure gas. If a low-pressure cylinder is mistakenly transfilled using the West Winds system, then there is a risk that the cylinder may explode causing injury to the user. In addition, both systems require the removal of a gas flow control unit from the cylinder prior to transfill and the reconnection of a gas flow control unit after the cylinder has been refilled. These extra steps significantly increase the time taken to refill a cylinder ready for use and may require specialist training.

Widget World of Blackpole Trading Estate East, Blackpole Road, Worcester, WR3 8SG, United Kingdom provides a high pressure helium gas cylinder system for filling balloons under the trade mark MIDGET WIDGET. The system comprises a high-pressure helium gas cylinder with a valve that acts to secure the contents of the cylinder and regulates the pressure of the gas within the cylinder. The system has an operating handle, which operates the valve and which acts as a balloon-filling adapter. The handle is transported separately from the cylinder and is fitted by the end-user. The cylinder of this system must be returned to the depot for re-filling as it is charged to high pressure. It is not possible to refill the cylinder at the retail outlet.

There is a need, therefore, for a transfill system that can be used to refill a pressurized gas cylinder in situ, i.e. at the place at which the cylinder is used or sold, rather than having to transport the empty cylinder to a refilling depot. There is also a need to simplify the sequence of steps taken to refill a cylinder so that no specialist training is required and so that the overall length of time taken to fill a cylinder is reduced.

SUMMARY OF THE INVENTION

It has been found that these needs have, at least in part, been fulfilled using the present invention. Accordingly, there is provided as a first aspect of the present invention, a valve assembly comprising a first gas flow control unit for controlling the flow of pressurized gas to and from a pressurized container and a second gas flow control unit for controlling the flow of gas from a high pressure gas source to the container, wherein the first control unit comprises:

- a first valve housing for mounting said first control unit in gas flow communication with the interior of the container, said housing having a first gas flow path; and
- a first valve located in the first gas flow path to open and close said path which, in use, is biased in a closed position;

and wherein the second gas flow control unit comprises:

- a second valve housing for mounting said second control unit in gas flow communication with the interior of the high pressure gas source, said housing having a second gas flow path; and
- a second valve located in the second gas flow path to open and close said path which, in use, is biased in a closed position;

said assembly further comprising actuating means for co-operatively opening the first and second valves when the first and second control units are brought into compressed engagement, wherein said actuating means comprises a gas flow path located therethrough to provide gas flow communication between said first and second gas flow paths.

The invention provides a transfill system that allows pressurized gas cylinders to be refilled in situ in a safe, efficient and cost effective manner. The present invention is simple to use, requires no mechanical skills and minimal training. In addition, the valve on the cylinder can be used not only to transfill the cylinder but also to dispense gas from the cylinder. The transfill process is simplified, as the valve on the cylinder does not need to be replaced before transfilling. The valve on the cylinder is simply brought into compressed engagement with the valve of the source of high-pressure gas. This reduces the time taken to refill a cylinder and the necessity for tools and specialist training. In this connection, it may be necessary to use a tool to remove a nozzle from the valve of the cylinder before the cylinder may be transfilled. However, tools to remove the valve from the cylinder are not required.

As the transfill process is simplified using the present invention, the risk of an accident resulting from the incorrect application of the transfill sequence of steps is reduced. The present invention also makes it difficult for users to tamper with and/or bypass the protective systems.

The valve assembly of the present invention allows low pressure gas containers, such as cylinders, to be re-filled without having to remove the gas flow control units and without having to use tools to form mechanical joints. In other words, the same gas flow control unit is used to dispense gas from the container as is used to refill the container.

According to a second aspect of the present invention, there is provided apparatus for filling a pressurized gas container comprising:

- a second control unit as defined by the first aspect of the present invention;
- conduit means for supplying pressurized gas from a pressurized gas source to said second control unit; and
- means for providing compressed engagement between said second control unit and co-operating first control unit of the valve assembly as defined by the first aspect of the present invention;
- wherein gas enters the container via the conduit means and the valve assembly when the first and second control units are brought into compressed engagement.

According to a third aspect of the present invention, there is provided a pressurized gas cylinder having an outlet in which is mounted a first control unit as defined in the first aspect of the present invention.

According to a fourth aspect of the present invention, there is provided a system for filling pressurized gas cylinders comprising:

- apparatus according to the second aspect of the present invention; and
- a plurality of pressurized gas cylinders according to the third aspect of the present invention.

According to a fifth aspect of the present invention, there is provided a method of filling a pressurized gas container from a source of high pressure gas comprising;

- providing a valve assembly as according to the first aspect of the present invention in gas flow communication with a pressurized gas container and said pressured gas source; and
- providing compressed engagement between the first control unit 1 and the second control unit of the valve assembly.

BRIEF DESCRIPTION OF THE DRAWINGS

FIG. 4b is a cross-sectional view of the transfill actuation system through the plane indicated by line M shown in FIG. 4a.

DETAILED DESCRIPTION OF THE INVENTION

Figure 1:
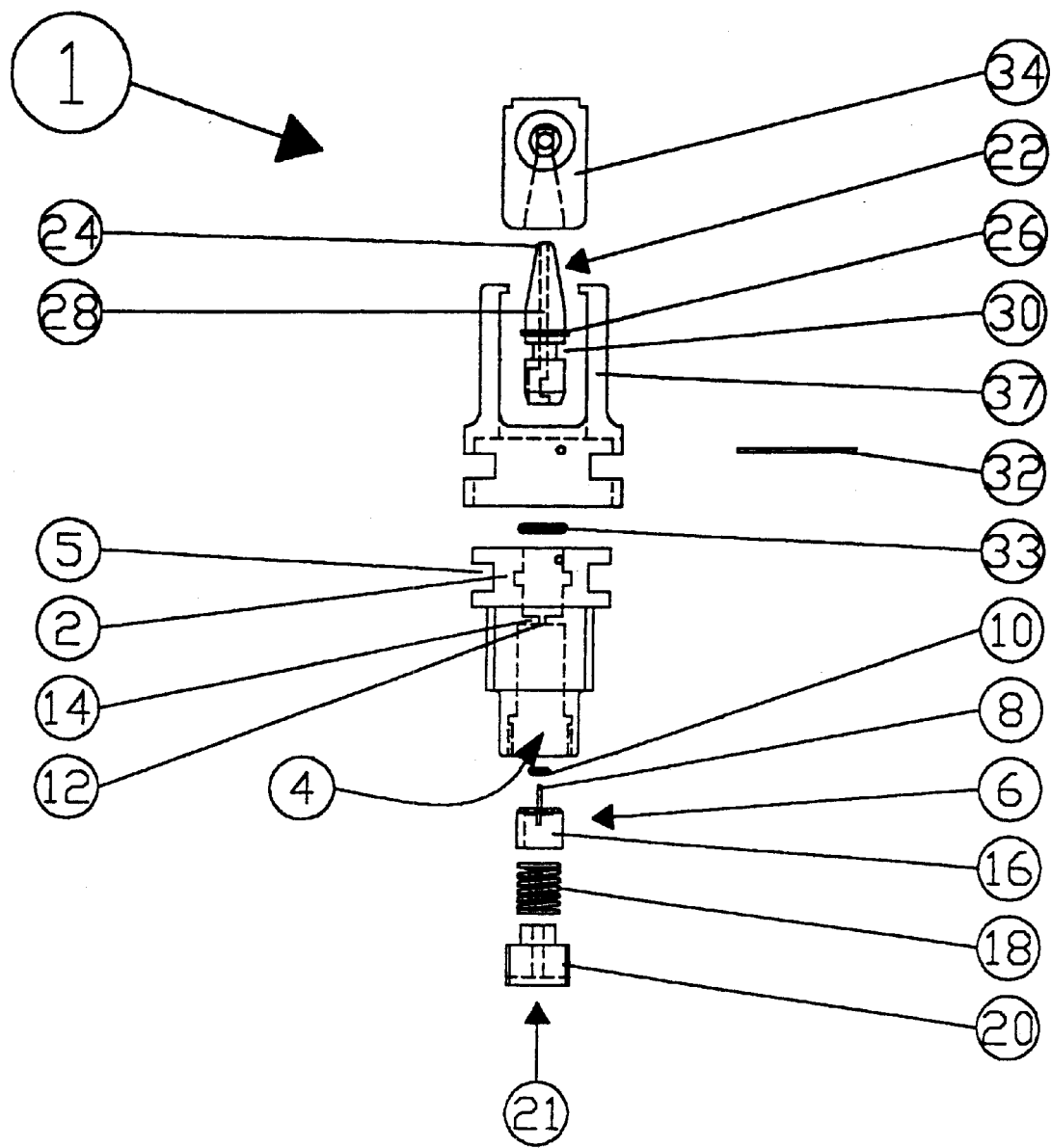
FIG. 1 is an exploded view of a gas flow control unit for use with a pressurized gas container.

The valve assembly of the present invention comprises a first gas flow control unit for controlling the flow of presurized gas to and from a pressurized container and a second gas flow control unit for controlling the flow of gas from a high pressure gas source to the container.

The first control unit comprises a first valve housing for mounting the first control unit in gas flow communication with the interior of the container. The first valve housing has a first gas flow path. The first control unit also comprises a first valve located in the first gas flow path to open and close the path which, in use, is biased in a closed position.

The second gas flow control unit comprises a second valve housing for mounting the second control unit in gas flow communication with the high pressure gas source. The second valve housing has a second gas flow path. The second control unit also comprises a second valve located in the second gas flow path to open and close said path which, in use, is biased in a closed position.

The assembly further comprises actuating means for co-operatively opening the first and second valves when the first and second control units are brought into compressed engagement. The actuating means comprises a gas flow path located therethrough to provide gas flow communication between said first and second gas flow paths.

During transfill using this assembly, the valve on a pressurized container may be co-operatively opened with the valve of the high-pressure gas source using a lever action. This allows easy operation for unskilled operators.

The actuating means for co-operatively opening the first and second valves may have any suitable form provided it has a path along which gas may flow. In one arrangement, the means is a single insert having a body capable of opening both the first and second valves. However, in a preferred embodiment, the actuating means comprises a first insert having a body with a first surface and a second insert having a body with a second surface wherein the first and second surfaces engage to move their respective valves to the open positions. In this arrangement, the body of each insert has a gas flow path that comes into gas flow communication when the means is operated. The first surface may be provided by a tapered portion of the first insert and the second surface may be provided by, for example, a correspondingly flared portion of the second insert or at least one ridge that engages the tapered surface. In a preferred embodiment, the first surface is provided by a flange mounted on the first insert and the second surface is provided by an end wall of the second insert. Preferably, the gas flow path of the actuating means extends through the inserts.

The first valve may be any type of valve that can remain biased in the closed position by, for example, the pressure of the gas within the cylinder. However, it is preferred that the first valve is a poppet-valve having a pin extended through an aperture defined by an annular flange provided perpendicularly on the inside wall of the first valve housing and wherein the actuating means acts directly on the pin of the poppet-valve.

In addition, the second valve can be any suitable valve but is preferably a poppet-valve having a pin extended through an aperture defined by an annular flange provided perpendicularly on the inside wall of the second valve housing and wherein the actuating means acts directly on the pin of the poppet-valve.

Poppet valves can be additionally biased in the closed position using a resilient member acting thereon. Preferably, the resilient member is a compression spring.

Preferably, the valve assembly further comprises means to prevent the removal of the actuating means from the valve housings. In one preferred embodiment, a pin extends perpendicularly from the interior wall of the valve housing into a cavity in the body of the first or second insert of the actuating means.

As a safety precaution, the second valve housing may comprise an emergency pressure release device such as a bursting disc and/or relief valve.

A container comprising the first gas flow control unit of the invention may further comprise a nozzle for controlling the direction of flow of gas dispensed from the container. In a preferred arrangement of this embodiment, the container may further comprise a nozzle guard for protecting the nozzle from accidental activation, said guard being mountable on the first gas flow control unit.

The present invention is particularly useful in the transfer of helium gas.

In use, a cylinder having a first gas control unit according to the invention is placed in a filling station having a transfill actuation system. A second gas flow control unit is in gas flow communication with a high-pressure gas source. In a preferred arrangement, the second control unit is lowered using the transfill actuation system until it mates with the first control unit mounted on the cylinder. The second control unit may be lowered using any suitable means, for example, by moving a handle through a shaft, spur gear and rack. However, other means, such as a screwjack or pneumatic or hydraulic pistons, may also be used.

Once the gas control units are engaged, they are compressed together. The first and second valves are cooperatively forced open against the bias of the gas pressure (and optionally the resilient member) in the container by the actuating means and the high pressure gas source respectively thereby forming a continuous gas flow path from the high pressure gas source, through the second valve, along the gas flow path of the body of the actuating means, through the first valve and into the interior of the container.

Gas flows from the high pressure gas source through a pressure-reducing valve or "regulator", through the second gas flow control unit and through the first gas flow control unit to the container. The regulator reduces the gas pressure from the pressure in the high pressure gas source to the required pressure for the container. Flow stops once the pressure in the container reaches the required pressure. Once the second control unit is brought out of compressed engagement with the first control unit, the container is immediately ready for use.

Figure 3:
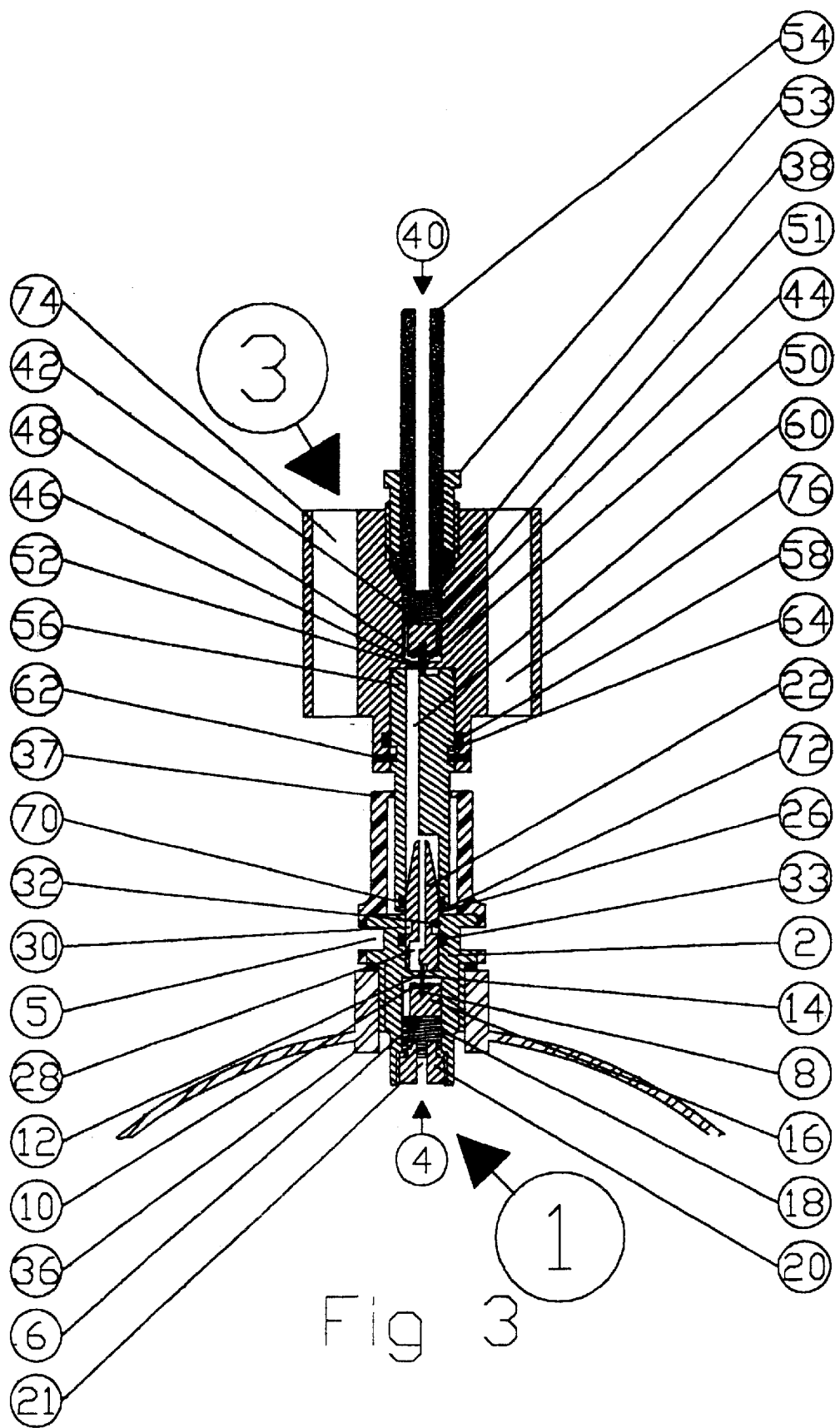
FIG. 3 is a cross-sectional view of the gas flow control unit of the container in compressed engagement with the gas flow control unit of the high pressure gas source.

Referring to FIGS. 1 and 3, the gas flow control unit 1 comprises valve-housing 2 having a gas flow path 4 located therethrough. The valve housing 2 also has a support groove 5 into which can be inserted a support flange 109 mounted on a transfill actuation system (see FIG. 4b). A poppet valve 6 having a pin 8 is located in the valve housing 2 with the pin 8 extending through the hole in an O-ring 10 and an aperture 12 formed by an annular flange 14 on the interior wall of the housing 2. In use, the poppet valve 6 remains in the closed position because the pressure of the gas in the container forces the body 16 of the valve against the O-ring thereby isolating the gas within the container. The poppet valve 6 may be additionally biased in the closed position using a resilient member such as a compression spring 18. The spring 18 is retained in position by a locking screw 20, which is drilled to provide a gas flow path 21.

An insert 22 has a tapered portion 24 and an annular flange 26. Importantly, the insert 22 also has a bore 28. The insert 22 is located within the valve housing 2 and is in contact with the pin 8 of the poppet valve 6. The insert 22 also has a groove 30 into which the end of the pin 32 may be inserted so as to prevent the removal of the insert 22 from the valve housing 2. An O-ring 33 is used to provide a seal between the insert 22 and the valve housing 2.

A nozzle 34 may be attached to the tapered portion 24 of the insert 22. In use, when the nozzle 34 is depressed, it forms a gas-tight seal with the tapered portion 24 of the insert 22. This can be achieved by providing a flared portion inside the nozzle that corresponds with the tapered portion of the insert 22. The insert 22 is forced against the pin 8 of the poppet valve 6, which is pushed open against the pressure of the gas in the container and against the compression spring 18. Gas flows from the interior of the container 36, through the path 21 and the valve 6, through the insert 22 and along the bore 28 and is dispensed from the nozzle 34. When the nozzle 34 is released, the valve 6 is closed by a combination of the pressure of the remaining gas in the container 36 and the release of the compression spring 18. The remaining gas in the container is thereby isolated.

The gas flow control unit may also comprise a nozzle guard 37, which is attached to the valve housing 2 and protects the nozzle 34 from accidental activation. A pin 32 may extend through nozzle guard 37 and the valve housing 2 in order to prevent the removal of the insert 22.

Figure 2:
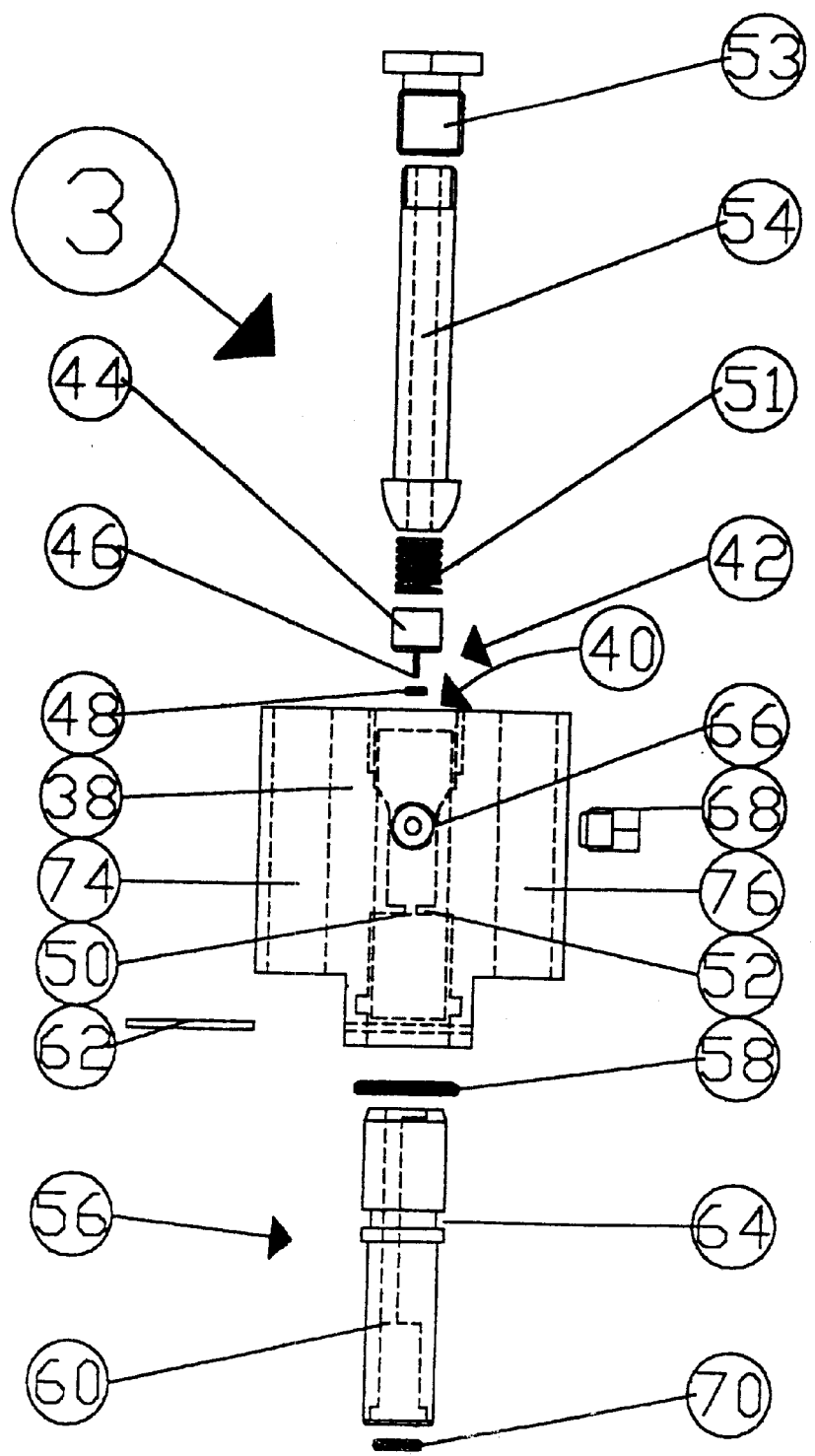
FIG. 2 is an exploded view of a gas flow control unit for use with a high-pressure gas source.

Referring to FIGS. 2 and 3, the gas flow control unit 3 in gas flow communication with the high pressure gas source (not shown) comprises a valve-housing 38 having a gas flow path 40. The housing also comprises two guide paths 74, 76, in each of which is located a guide shaft (not shown) when the housing is incorporated in a transfill actuation system. A poppet valve 42, located within the path 40, has a pin 46 extending from body 44 through an O-ring 48 and an aperture 50 formed by an annular flange 52 provided on the interior wall of the valve housing 38. The pressure of the gas from the high-pressure gas source forces the body 44 of the valve 42 against O-ring 48 thereby isolating the source of the gas. A compression spring 51 is used to additionally bias the valve 42 in the closed position and is retained in position using a screw 53 and a nipple 54.

An insert 56 is located within the housing 38 and the O-ring 58 forms a gas tight seal between the insert 56 and the interior wall of the housing 38. The insert 56 has a bore 60 and is in contact with the pin 46 of the poppet valve 42. The movement of the insert 56 relative to the housing 38 is restricted using a pin 62, which extends through the housing 38 into a groove 64 provided on the insert 56. The housing 38 further comprises an emergency pressure relief valve comprising a bursting disc 68 located in a bore 66. The relief valve is fitted in pipework between the nipple 54 and a pressure regulator (not shown) from the high-pressure gas source.

FIG. 3 depicts the first gas flow control unit 1 in compressed engagement with the second gas flow control unit 3. Surface 72 of insert 56 acts on flange 26 of insert 22. In the compressed position shown, a continuous gas flow path 40, 50, 60, 28, 12, 4 is created allowing gas to flow from the source of high pressure compressed gas into the container 36.

In use, the gas flow control unit 3 of the high-pressure gas source is brought into compressed engagement with the gas flow control unit 1 on the container 36.

The insert 56 fits over the insert 22 and a gas-tight seal is formed using an O-ring 70. The surface 72 of the end portion of the insert 56 engages the flange 26 of the insert 22. The two control units are brought into compressed engagement using a transfill actuation system that operates by a lever action provided by a handle, a screwjack or a piston (pneumatic or hydraulic). The compressed engagement causes the inserts to move relative to the valve housings thereby substantially simultaneously opening the first and second valves of the valve assembly. Once the valves are open, gas flows from the high-pressure gas source, through the valve assembly to the interior of the container.

Figure 4A:
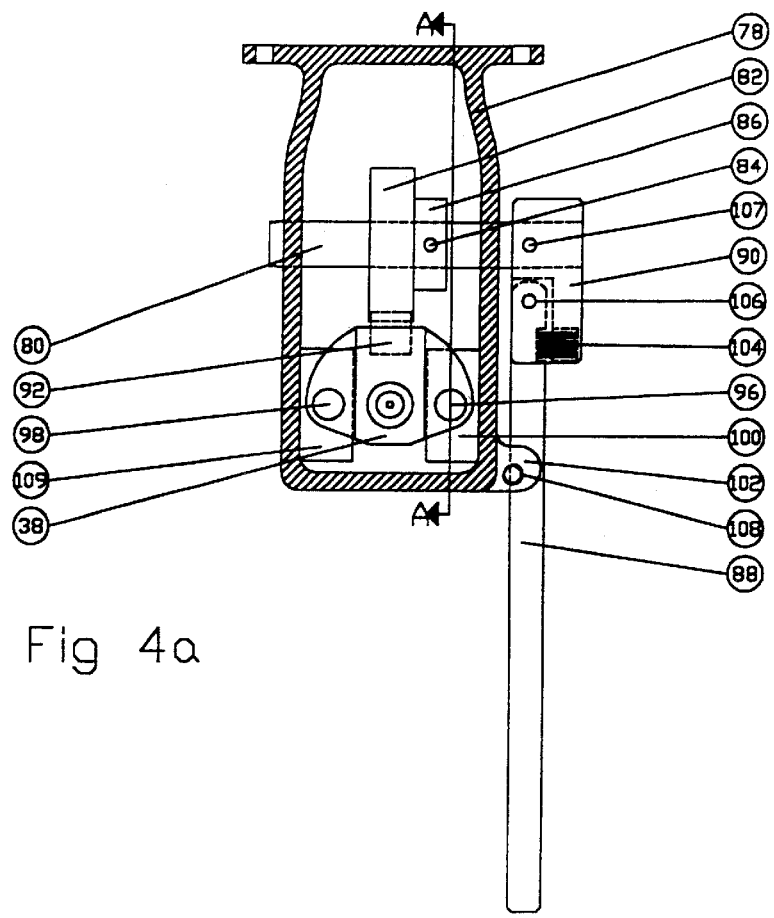
FIG. 4a is an overhead, cross-sectional view of the spur-gear-and-rack arrangement of the transfill actuation system.
Figure 4B:
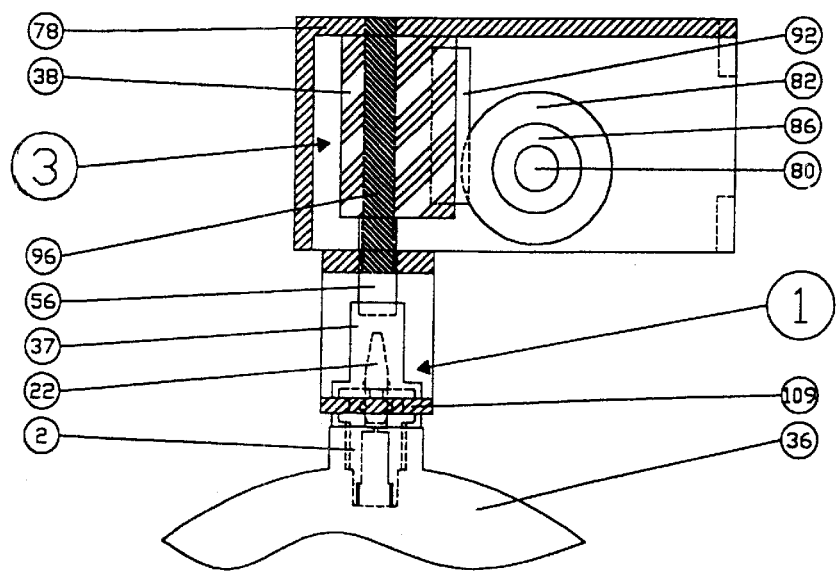

Referring to FIGS. 4a and 4b, support frame 78 is fixedly mounted to a suitable support surface (not shown) such as a pressurized gas cylinder or a wall. The shaft 80 is rotatably mounted (along its longitudinal axis) on the support frame 78. A spur gear 82 is fixedly mounted on the shaft 80 via a pin 84 that extends through a hub 86 of the spur gear into the shaft 80. Lever handle 88 is mounted on the shaft 80 via connector 90 and the mounting pins 106, 107 such that the lever handle, connector and shaft form a crank. The spur gear 82 turns when the lever handle 88 is moved up or down.

A spur rack 92 is fixedly mounted on the housing 38 of the second gas flow control unit 3 and engages the spur gear 82. One end of each guide shaft 94 and 96 is fixedly mounted in a locating hole in the support frame 78 and the other end is fixedly mounted in a locating hole in support flanges 98, 100 respectively. The guide paths 74 and 76 of the housing 38 of second gas flow control unit 3 are mounted on the guide shafts 94, 96 respectively of support frame 78. The second gas flow control unit 3 moves relative to the support frame 78 along the guide shafts 94, 96 as a result of the lever action of the handle 88.

When the first and second control units are in compressed engagement, the pressure of the gas flowing from the high pressure gas source to the pressurized gas cylinder acts to force the control units apart. Rather than have the operator hold the handle 88 down for the duration of the transfilling operation, the support frame 78 is provided with a locking flange 102 that acts as a downlock for the handle 88. To lock the handle 88 down, the handle 88 is moved laterally around mounting pin 106 to compress spring 104. The handle 88 is then rotated around shaft 80 until it is below the level of locking flange 102. When handle 88 is released, the spring 104 forces the handle 88 under the locking flange 102. To unlock the system, the series of steps is simply reversed.

The locking flange 102 has a screw 108 that is adjustable and, thus, the maximum level to which the second control unit 3 may be lowered is adjustable.

Referring now to FIG. 4b, when the lever handle (not shown) is rotated, shaft 80 rotates around its longitudinal axis thereby rotating the spur gear 82. The spur gear 82 engages the spur rack 92 and, thus, rotation of the spur gear 82. causes the spur rack 92 to move up or down depending on the direction of rotation of the spur gear 82. The Housing 38 of the second control unit 3 is fixedly mounted on the spur rack 92 and therefore moves relative to the support frame 78 with the spur rack 92. In this way, the insert 56 of the second control unit 3 can be brought into compressed engagement with the insert 22 of the first control unit 1 mounted on pressurized gas cylinder 36.

A cylinder 36 having a first gas flow control unit 1 is positioned in the transfill actuation system so that a support flange 109, provided on the support frame 78, is located within the groove 5 of the first control unit 1. The support flange 109 thereby holds the cylinder in position while the second control unit 3 is brought into compressed engagement with the first control unit 1.

It will be appreciated that the invention is not restricted to the details described above with reference to the preferred embodiments but that numerous modifications and variations can be made without departing from the spirit or scope of the invention as defined in the following claims.

What is claimed is:

1. A valve assembly 1, 3 comprising a first gas flow control unit 1 for controlling the flow of pressurized gas to and from a pressurized gas container 36 and a second gas flow control unit 3 for controlling the flow of gas from a high pressure gas source to the container 36, wherein the first gas flow control unit 1 comprises:

a first valve housing 2 for mounting said first gas flow control unit 1 in gas flow communication with the interior of the container 36, said housing 2 having a first gas flow path 4; and a first valve 6 located in the first gas flow path 4 to open and close said path which, in use, is biased in a closed position;

and wherein the second gas flow control unit 3 comprises:

a second valve housing 38 for mounting said second gas flow control unit 3 in gas flow communication with the gas source, said housing having a second gas flow path 40; and a second valve 42 located in the second gas flow path 40 to open and close said path which, in use, is biased in a closed position;

said assembly further comprising actuating means 22, 56 for co-operatively opening the first and second valves when the first and second gas flow control units are brought into compressed engagement, wherein said actuating means comprises a gas flow path located therethrough to provide gas flow communication between said first and second gas flow paths.

2. The valve assembly according to claim 1 wherein the actuating means 22, 56 for co-operatively opening the first and second valves comprises a first insert 22 and a second insert 56, the first insert 22 being moveable to open said first valve and having a first surface 24, 26 and the second insert 56 being moveable to open said second valve and having a second surface 72 wherein the first and second surfaces engage to move their respective valves to the open positions.

3. The valve assembly according to claim 1, wherein the first gas flow control unit 1 is adapted to engage a nozzle 34 for directing the flow of gas released from the container 36 when the nozzle 34 is depressed.

4. Apparatus for filling a pressurized gas container 36 having a first gas flow control unit 1 comprising:

a first valve housing 2 for mounting said first gas flow control unit 1 in gas flow communication with the interior of the container 36, said housing 2 having a first gas flow path 4;

a first valve 6 located in the first gas flow path 4 to open and close said path which, in use, is biased in a closed position, and a first insert 22 being movable to open said first valve and having a first surface 24, 26, said apparatus comprising:

a second gas flow control unit 3 comprising:

a second valve housing 38 for mounting said second gas flow control unit 3 in gas flow communication with a high pressure gas source, said housing having a second gas flow path 40;

a second valve 42 located in the second gas flow path 40 to open and close said path which, in use, is biased in a closed position; and a second insert 56 being movable to open the second valve and having a second surface 72 for engagement with the first surface 24, 26 of the first insert 22;

conduit means for supplying pressurized gas from said high pressure gas source to said second gas flow control unit; and means for providing compressed engagement between said second gas flow control unit 3 and said co-operating first gas flow control unit 1 of the container 36;

wherein gas enters the container 36 via the conduit means, the second gas flow control unit 3 and the first gas flow control unit 1 when the first and second gas flow control units are brought into compressed engagement and the first and second surfaces of the inserts engage to move their respective valves to the open positions.

5. The apparatus according to claim 4, comprising means for reducing the pressure of the gas located upstream of the second gas flow control unit 3.

6. The apparatus according to claim 4, wherein the means for providing compressed engagement between the first and second gas flow control units operates using a lever action.

7. Apparatus for filling a pressurized gas container 36 having a first gas flow control unit 1 comprising:

a first valve housing 2 for mounting said first gas flow control unit 1 in gas flow communication with the interior of the container 36, said housing 2 having a first gas flow path 4;

a first valve 6 located in the first gas flow path 4 to open and close said path which, in use, is biased in a closed position, and a first insert 22 being movable to open said first valve and having a first surface 24, 26, said apparatus comprising:

a second gas flow control unit 3 comprising:

a second valve housing 38 for mounting said second gas flow control unit 3 in gas flow communication with a high pressure gas source, said housing having a second gas flow path 40;

a second valve 42 located in the second gas flow path 40 to open and close said path which, in use, is biased in a closed position; and a second insert 56 being movable to open the second valve and having a second surface 72 for engagement with the first surface 24, 26 of the first insert 22;

said second gas flow control unit 3 being movable from a first position in which said second gas flow control unit 3 is disengaged from the first gas flow control unit 1 to a second position in which said second gas flow control unit 3 is in compressed engagement with the first gas flow control unit 1;

conduit means for supplying pressurized gas to said second gas flow control unit;

means for reducing the pressure of the gas located upstream of the second gas flow control unit 3; and means for moving the second gas flow control unit 3 between the first position and the second position;

wherein gas enters the container 36 via the conduit means, the second gas flow control unit and the first gas flow control unit when the first and second gas flow control units are brought into compressed engagement and the first and second surfaces of the inserts are engaged to move their respective valves to the open positions.

8. A pressurized gas cylinder having an outlet in which is mounted a first gas control unit comprising:

a first valve housing 2 for mounting said first gas flow control unit 1 in gas flow communication with the interior of the cylinder 36, said housing 2 having a first gas flow path 4; a first valve 6 located in the first gas flow path 4 to open and close said path which, in use, is biased in a closed position, and a first insert 22 being movable to open said first valve and having a first surface 24, 26 for engagement with a nozzle or a second surface 72 of a second insert 56 of a second gas flow control valve 3 mounted in gas flow communication with a high pressure gas source.

9. A system for filling pressurized gas cylinders comprising:
    apparatus comprising:
        a second gas flow control unit 3 comprising:
            a second valve housing 38 for mounting said second gas flow control unit 3 in gas flow communication with a high pressure gas source, said housing having a second gas flow path 40;
            a second valve 42 located in the second gas flow path 40 to open and close said path which, in use, is biased in a closed position; and
            a second insert 56 being movable to open the second valve and having a second surface 72;
    conduit means for supplying pressurized gas from said high pressure gas source to said second gas flow control unit; and
    means for providing compressed engagement between said second gas flow control unit 3 and a co-operating first gas flow control unit of a cylinder 36; and
    a plurality of pressurized gas cylinders, each cylinder having an outlet in which is mounted a first gas control unit comprising:
        a first valve housing 2 for mounting said first gas flow control unit 1 in gas flow communication with the interior of the cylinder 36, said housing 2 having a first gas flow path 4;
        a first valve 6 located in the first gas flow path 4 to open and close said path which, in use, is biased in a closed position, and
        a first insert 22 being movable to open said first valve and having a first surface 24,26 for engagement with said second surface 72 of said second insert 56 of said second gas flow control valve 3,
    wherein gas enters a cylinder 36 via the conduit means, the second gas flow control unit 3 and the first gas flow control unit 1 when the first and second gas flow control units are brought into compressed engagement and the first and second surfaces of the inserts engage to move their respective valves to the open positions.

10. A method of filling a pressurized gas container from a source of high pressure gas comprising;
    providing a first gas flow control unit 1 in gas flow communication with a pressurized gas container 36, said first gas flow control unit 1 comprising:
        a first valve housing 2 for mounting said first gas flow control unit 1 in gas flow communication with the interior of the container 36, said housing 2 having a first gas flow path 4;
        a first valve 6 located in the first gas flow path 4 to open and close said path which, in use, is biased in a closed position, and
        a first insert 22 being movable to open said first valve and having a first surface 24, 26,
    providing a second gas flow control unit 3 in gas flow communication with a source of high pressure gas, said second gas flow control unit 3 comprising:
        a second valve housing 38 for mounting said second gas flow control unit 3 in gas flow communication with the gas source, said housing having a second gas flow path 40;
        a second valve 42 located in the second gas flow path 40 to open and close said path which, in use, is biased in a closed position; and
        a second insert 56 being movable to open the second valve and having a second surface 72 for engagement with the first surface 24, 26 of the first insert 22 of the first gas flow control unit 1; and
    providing compressed engagement between the first gas flow control unit 1 and the second gas flow control unit 3 such that the first and second surfaces of the inserts engage to move their respective valves to the open positions.

11. The method according to claim 10, wherein the gas is helium.

12. The method according to claim 10, wherein the compressed engagement is provided using a lever action.

* * * * *